United States Patent
Kono (10) Patent No.: US 7,403,799 B2
(45) Date of Patent: Jul. 22, 2008

(54) BASE STATION AND CALL SEARCH METHOD USED FOR THE SAME

(75) Inventor: Masaki Kono, Saitama (JP)

(73) Assignee: NEC Corporation, Tokyo (JP)

(*) Notice: Subject to any disclaimer, the term of this patent is extended or adjusted under 35 U.S.C. 154(b) by 282 days.

(21) Appl. No.: 10/499,843

(22) PCT Filed: Mar. 18, 2003

(86) PCT No.: PCT/JP03/03261

§ 371 (c)(1),
(2), (4) Date: Jun. 22, 2004

(87) PCT Pub. No.: WO03/079712

PCT Pub. Date: Sep. 25, 2003

(65) Prior Publication Data

US 2005/0020235 A1    Jan. 27, 2005

(30) Foreign Application Priority Data

Mar. 20, 2002    (JP)    ............... 2002-077438

(51) Int. Cl.
*H04M 1/00*    (2006.01)

(52) U.S. Cl. ............... 455/561; 455/449; 455/515; 455/424; 455/434; 455/444; 370/508; 370/519

(58) Field of Classification Search ............... 455/404.2, 455/421, 446, 449, 443, 444, 424, 434, 456.1, 455/515, 561; 370/508, 519
See application file for complete search history.

(56) References Cited

U.S. PATENT DOCUMENTS

| | | | |
|---|---|---|---|
| 6,308,072 B1 * | 10/2001 | Labedz et al. ............... | 455/448 |
| 6,363,261 B1 * | 3/2002 | Raghavan ............... | 455/561 |
| 6,577,616 B1 * | 6/2003 | Chaudry et al. ............... | 370/342 |
| 6,944,454 B1 * | 9/2005 | Lee et al. ............... | 455/443 |
| 2001/0026540 A1 | 10/2001 | Haim | |
| 2004/0067759 A1 * | 4/2004 | Spirito et al. ............... | 455/456.1 |
| 2005/0075111 A1 * | 4/2005 | Tafazolli et al. ............... | 455/456.1 |

FOREIGN PATENT DOCUMENTS

| | | | |
|---|---|---|---|
| JP | 10-513619 | | 12/1998 |
| JP | 2000-92564 | | 3/2000 |
| JP | 2000-092564 | * | 3/2000 |
| JP | 2000-183805 | | 6/2000 |

* cited by examiner

Primary Examiner—Matthew Anderson
Assistant Examiner—Dominic E Rego
(74) Attorney, Agent, or Firm—Young & Thompson (57) ABSTRACT

In a base station providing a large-distance service area (large area) such as a mobile communication system WLL of the CDMA method, the time required for performing call search (path search) is reduced so as to reduce the call connection time. When performing a path search in the base station (8), a predetermined offset value from a reference time is set so that path search is performed only in a doughnut-shaped service area (30). Thus, there is no need of performing path search in the vicinity of the base station (8) and search is performed only in the doughnut-shaped service area (30). Thus, it is possible to reduce the path search time and reduce the call connection time.

9 Claims, 7 Drawing Sheets

BASE STATION AND CALL SEARCH METHOD USED FOR THE SAME

TECHNICAL FIELD

The present invention relates to a base station and a call search method used in the same, and in particular, to a call search method used in a base-station wireless apparatus provided with a long-distance service area (large area) in a mobile communication system typified by WLL (Wireless Local Loop) employing the CDMA (Code Division Multiple Access) system.

BACKGROUND ART

Figure 1:
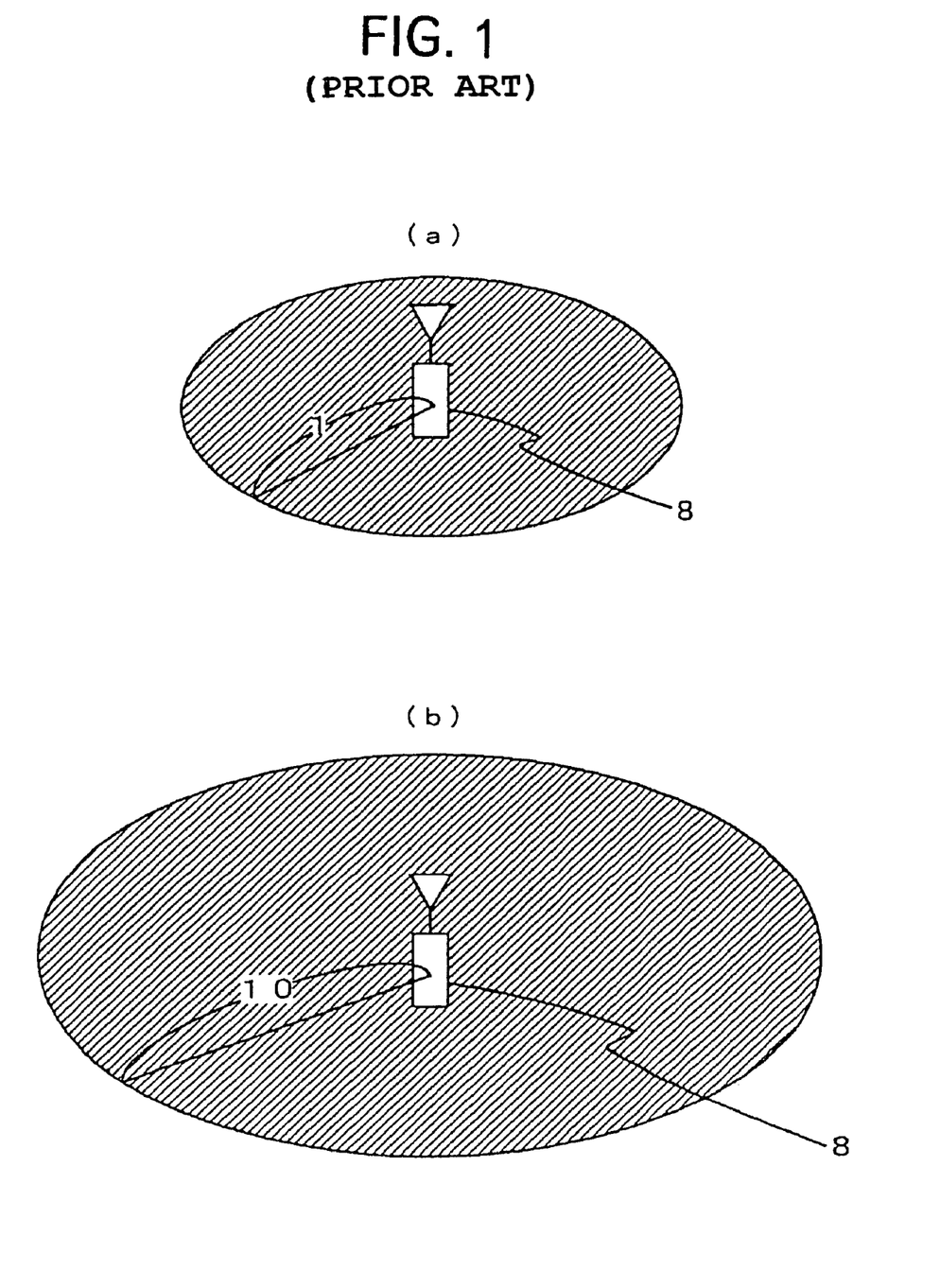
FIG. 1 is a diagram showing an example of a conventional service area.

There is a mobile communication system employing the CDMA system. In this kind of communication system, as shown in FIG. 1, a base-station wireless apparatus (hereinafter simply referred to as a base station) 8 provides CDMA communication service, which ideally has a service area concentrically extending around the centrally located base station 8 as shown in FIG. 1(a) by ordinary. Since this is always the same regardless of the size of the service area, a long-distance service area also concentrically extends as shown in FIG. 1(b) in the same manner as (a).

Figure 2:
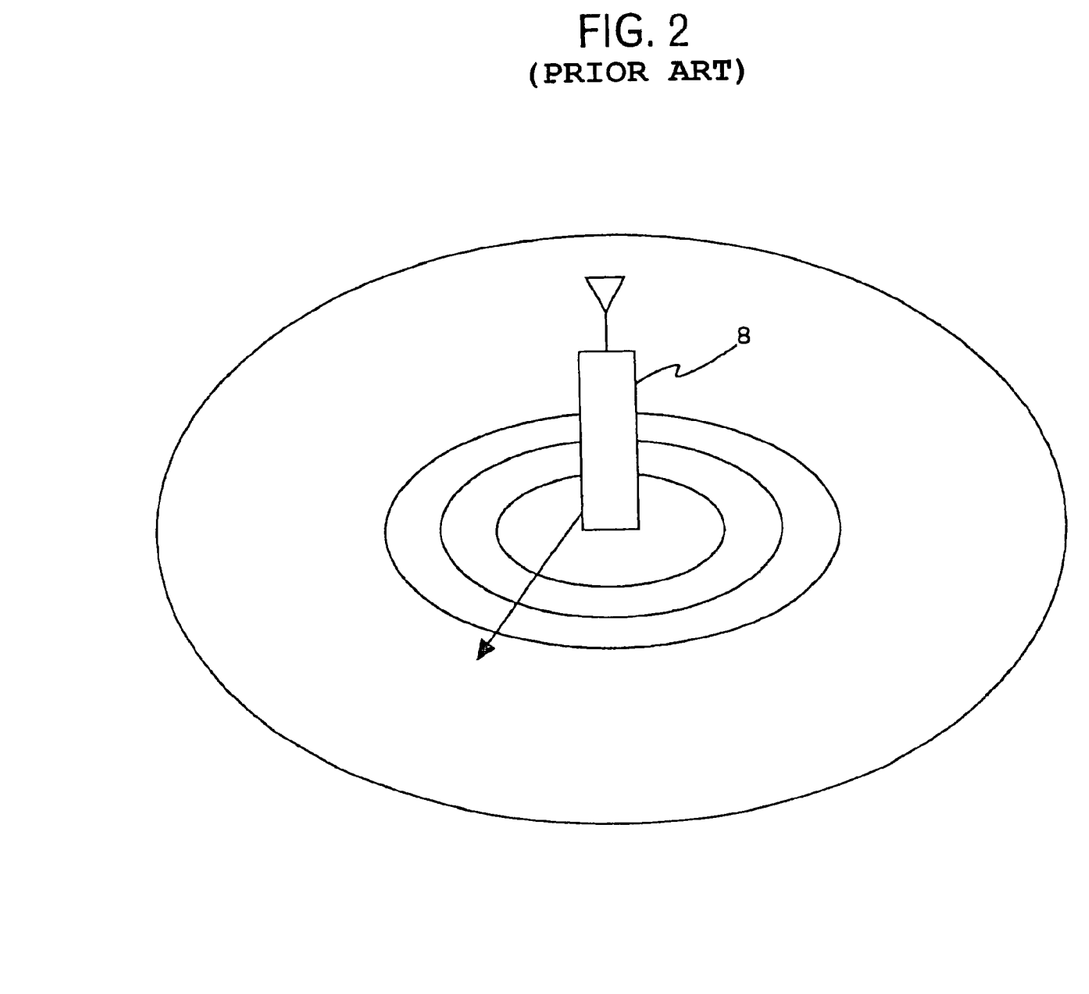
FIG. 2 is a diagram for explaining a search method in a base station.

As shown in FIG. 2, since the base station 8 always searches the service area for a calling party (a person who telephones by radio) as rippling out from the center to the circumference that is the end of the service area, the base station 8 takes a longer time (call connection time) to search for the calling party as the service area that covers the circle becomes large.

PROBLEMS TO BE SOLVED BY THE INVENTION

Figure 3:
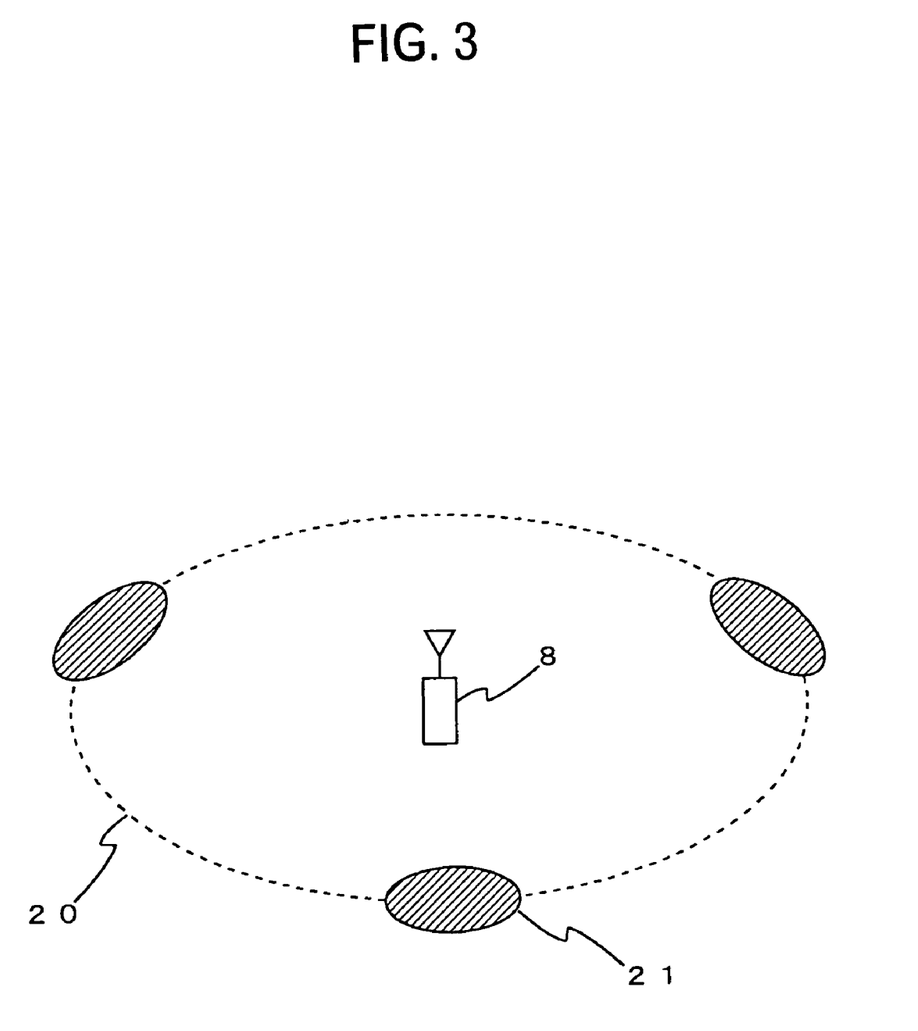
FIG. 3 is a diagram showing an example of a long-distance service area.

There is a mobile communication system typified by WLL provided with a long-distance service area (large area) employing the CDMA system based on IS-95 Standard by the Telecommunication Industry Association. As shown in FIG. 3, such WLL communication system often supports the areas 21 on the circumference 20 more than a few score kilometers distant from the centrally located base station 8 instead of covering the area in the vicinity of the base station 8 and designing plural areas to be overlapped as in the case of performing soft hand-off since no communication terminal is movable.

Also in this case, as explained with FIG. 2, when constantly performing the search for the calling party as rippling out from the center to the circumference 20, it takes longer time to conduct call search (referred to as path search), which giving rise to a problem of a longer call connection time. Moreover, the terminal has to continuously transmit call signals during the longer call connection time, which becomes interference with the other users.

It is therefore an object of the present invention to provide a call search (path search) method used in a base station to reduce the call connection time in a long-distance service area (large area) such as WLL.

It is another object of the present invention to provide a call search (path search) method capable of reducing interference between terminals (between users) by shortening the path search time.

DISCLOSURE OF THE INVENTION

According to the present invention, there is provided a base station for searching for a call from a terminal in a service area, comprising a search means for setting a predetermined offset value based on a base time to perform the search.

According to the present invention, there is provided a call search method used in a base station that searches for a call from a terminal in a service area, comprising a search step for setting a predetermined offset value based on a base time to perform the search.

The following are an explanation of an operation of the present invention. As described above, generally, since a WLL system does not have the area in the vicinity of the base station as a service area but often supports areas on a circumference more than a few score kilometers distant from the base station as a center, a service area is defined in a doughnut shape for performing optimization so as to reduce a path search time and a call connection time. To achieve this, when the base station performs the path search, a predetermined offset value based on a base time is set for the path search. By this means, the path search is not performed over the area in the vicinity of the base station but performed only within the doughnut-shaped service area, consequently reducing the path search time.

Incidentally, the reference numeral 1 denotes an antenna. The reference value 2 indicates an antenna-shared device. The reference numeral 3 shows a receiver. The reference numeral 4 denotes a search section. The reference numeral 5 indicates a demodulator. The reference numeral 7 shows a transmitter. The reference numeral 8 denotes a base station. The reference numeral 30 indicates a doughnut-shaped service area.

BEST MODE FOR CARRYING OUT THE INVENTION

Figure 4:
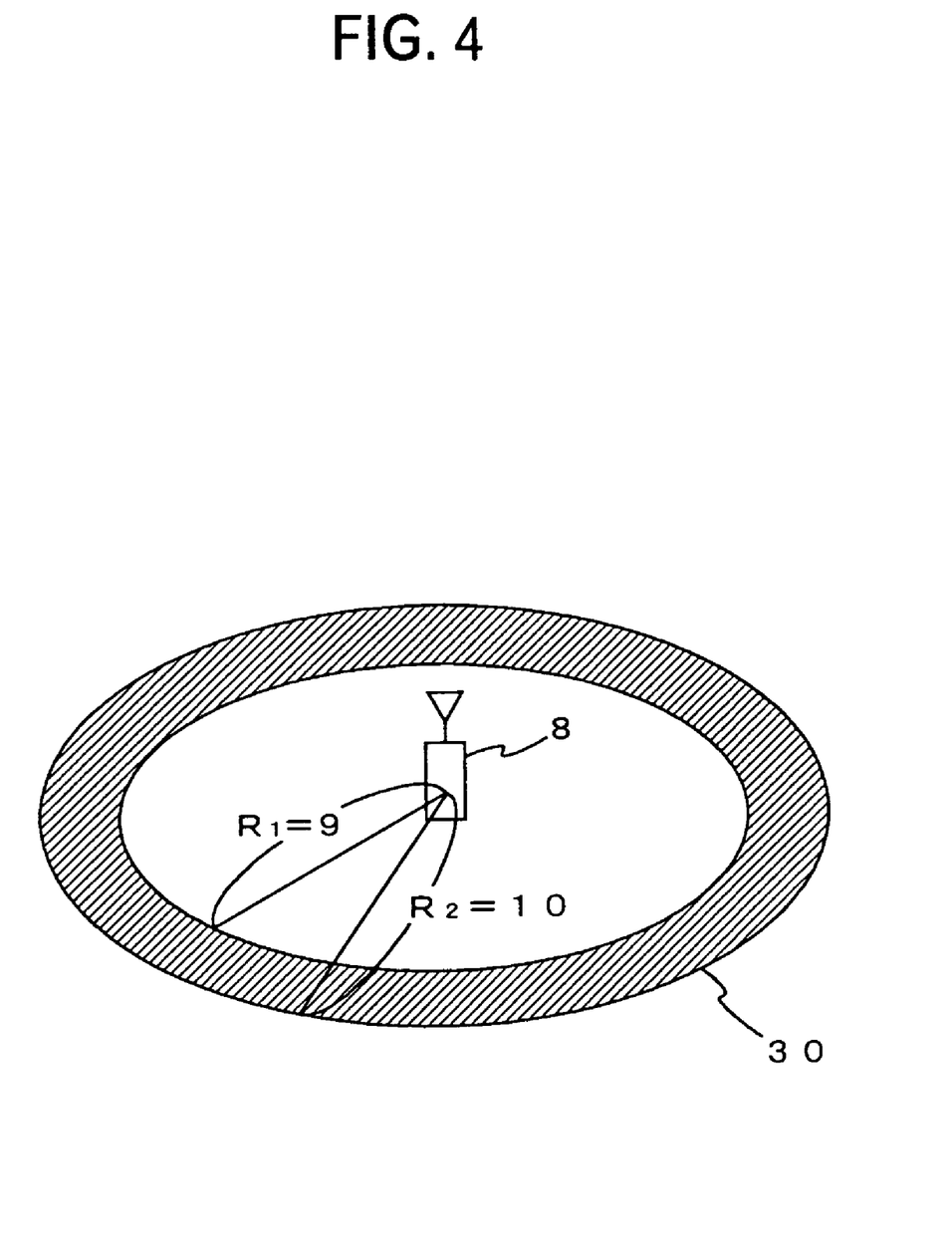
FIG. 4 is a schematic illustration showing a service area according to an embodiment of the present invention.

In the following, an explanation will be given of an embodiment of the present invention in reference to Figures. FIG. 4 is a diagram showing a relationship between a base station 8 and its service area 30 according to the embodiment of the present invention. According to the present invention, the service area 30 is optimized in the doughnut shape as shown in FIG. 4 instead of providing a conventional concentric-circle service area (cf. FIG. 1) on the basis of a fact that the WLL system does not have the service area in the vicinity of the base station 8 and not design areas to be overlapped as in the case of performing soft hand-off since no terminal is movable but often supports areas on a circumference more than a few score kilometers distant from the centrally located base station 8 as described hereinbefore with FIG. 3, thereby reducing the path search time and the call connection time.

For example, when the radius of the small area shown in FIG. 1(a) and the radius of the large area shown in FIG. 1(b) are determined as "1" and "10", respectively, and when the inner radius $R_1$ and the outer radius $R_2$ of the doughnut-shaped area in FIG. 4 are determined as "9" and "10", respectively, the time required for the path search becomes "1" in the case of FIG. 1(a), "10" in the case of FIG. 1(b), and "1" in the case of FIG. 4. While the time required for the path search in the case where the large area is designed using the conventional method is ten times as long as that in the case of the small area, the path search time in the case of the optimized doughnut-shaped search area becomes equal to the path search time in the case of the small area, from which it is apparent that the call connection time is drastically reduced.

Figure 5:
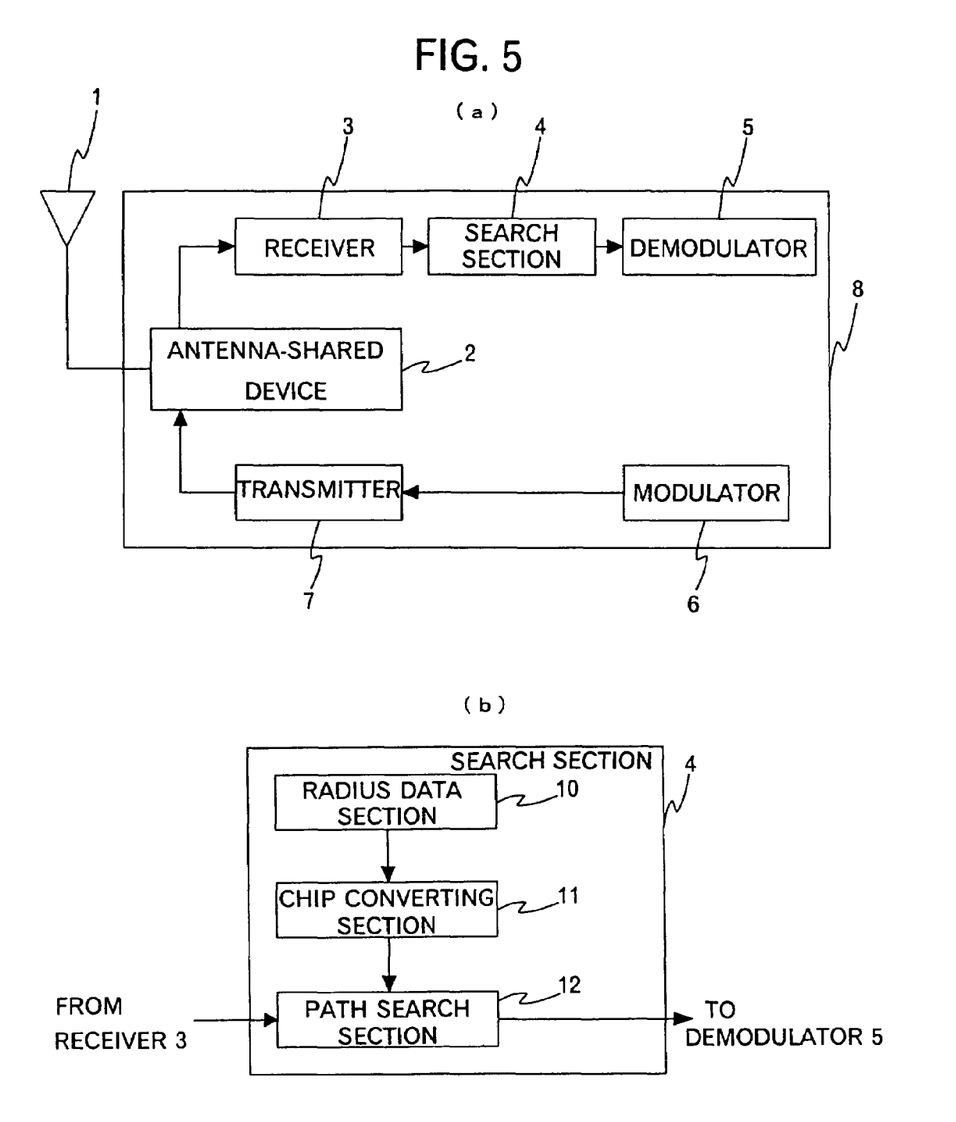
FIG. 5 is a block diagram showing a base station according to the embodiment of the present invention.

FIG. 5 is a block diagram showing the base station 8 using the CDMA system according to the embodiment of the present invention. In FIG. 5(a), the base station 8 comprises an antenna 1 for relaying signals transmitted and received between a calling party and the base station 8, an antenna-shared device 2 having a filter function for separating the signals relayed via the antenna 1 into receiving signals and transmitting signals, a receiver 3 for amplifying a received signal to remove interfering waves in the vicinity of the received signal, a search section 4 having parameters to change a path search area for finding an effective signal in the received signal from which noise has been removed, and a demodulator 5 for demodulating the effective signal found by the search section 4 to transmit it to an upper device not shown. Further, the base station 8 comprises a modulator 6 for modulating a signal from the upper device and a transmitter 7 for converting the modulated signal into a transmitting signal to transmit it to the antenna 1 via the antenna-shared device 2.

FIG. 5(b) is a block diagram showing a detail of the search section 4 in FIG. 5(a). The search section 4 comprises a radius data section 10 for inputting radius data on an inner radius $R_1$ and an outer radius $R_2$ of the doughnut-shaped service area 30 shown in FIG. 4, a chip converting section 11 for converting the radius data into chip-unit data, and a path search section 12 for determining a timing of path search on the basis of a chip offset (an offset value for determining a delay of a start time of path search from a base time) calculated by the chip converting section 11 to perform the path search.

The "chip" is a code for spreading a data symbol used in the CDMA system, and 1 chip=1/1.2288 MHz=0.814 µs since an IS-95 system has a 1.2288 MHz band.

In the following, before giving an explanation of an operation of the embodiment, an explanation will be given of an operation leading up to searching the small area in FIG. 1(a) for a calling party. First, radius data (inner radius and outer radius) for identifying the service area is input into the radius data section 10. In the case of a normal small area as shown in FIG. 1(a), the inner radius is "0". The chip converting section 11 converts the input radius data into chip-unit data, and subsequently, the path search section 12 searches an effective path area during the period from a base time (which is a base time on the basis of GPS) until the time delayed by the offset on the basis of the chip offset.

Hereat, since the IS-95 system has a 1.2288 MHz band, 1 chip=0.814 µs, and a search moving distance Lc per 1 chip becomes as follows.

$$Lc = 0.814 \mu s \times C = 244 m$$

Hereat, C is a velocity of light, and obtained by 3×(10 raised to the eighth power) m/s.

For example, in the normal area with radius 10 Km, the inner radius is 0 Km, the outer radius is 10 Km, and the search area (width) becomes as follows.

$$10,000/244 = 41 \text{ chips}$$

Accordingly, when searching the area with radius 10 Km, it is necessary to perform the search in the time range of the "base time+0 chip" to the "base time+41 chips".

Figure 6:
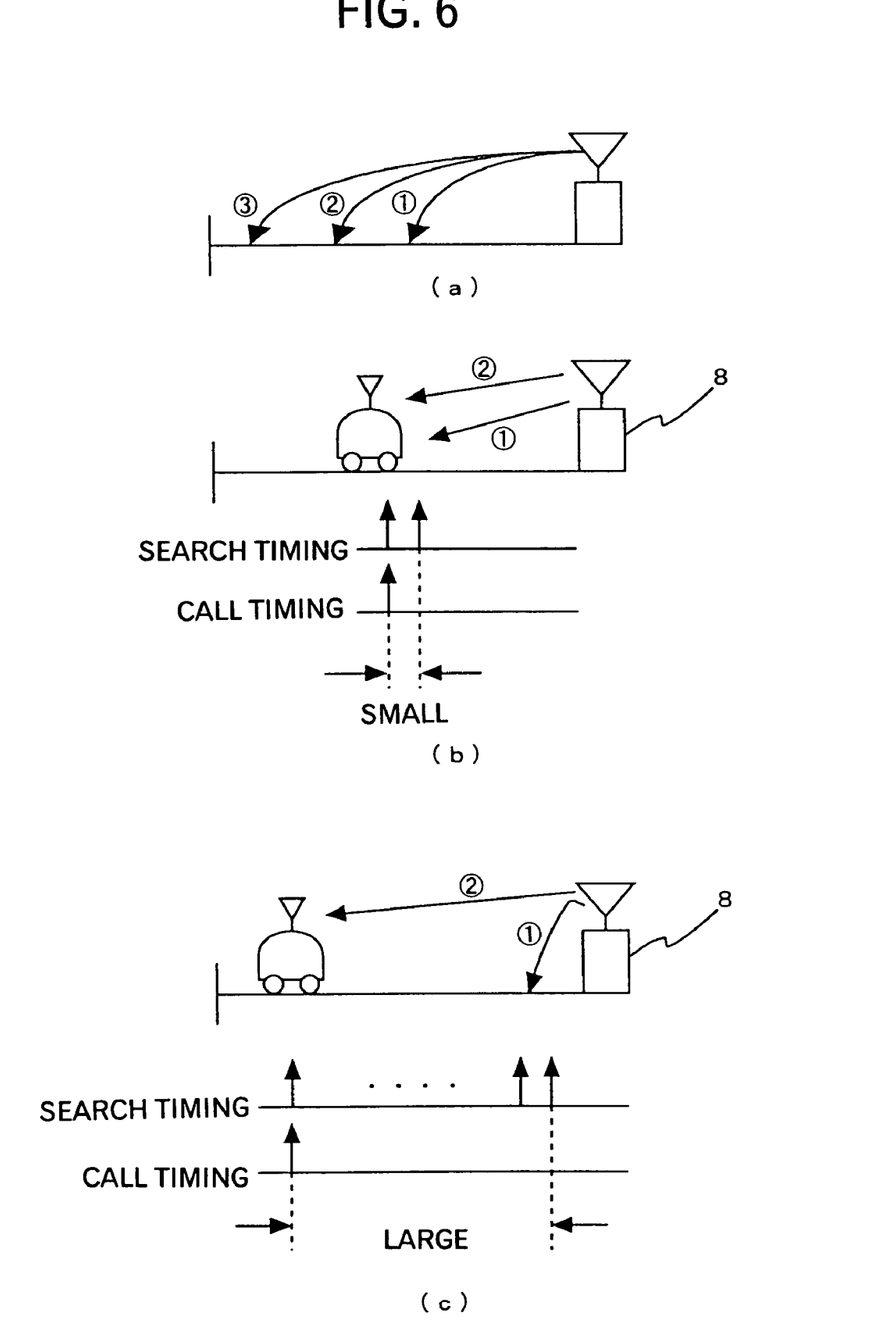
FIG. 6 is a diagram showing an example of a timing of a search by the base station and a timing of a call by a mobile terminal.

On the other hand, the base station constantly performs the search in the order of ①→②→③→①→ . . . as shown in FIG. 6(a) regardless of a call from a terminal. The time required for the search depends on a search width and the number of paths (the number of antennas), and the time required for the search is roughly calculated as follows in the case of the IS-95 system.

Search time=(search width×2)×the number of antennas×(ACC/Rake width)×Twalsh  (1)

Hereat, the number of antennas is "3" since 3-sector configuration is employed in general, the ACC is the number of symbols to be accumulated and determined to be "2", and the Rake width is the number of elements used for the search and determined to be "25". Moreover, the Twalsh is a time per 1 symbol and is 208 µs. The above-described respective values are fixed values.

If the aforementioned values are substituted into Equation (1), it would be found that the search of the area with a radius of 10 Km requires a search time of up to 4.1 ms.

As shown in FIG. 6(b), when a search and a call are performed in good timing, the time required for the search is reduced enough to be less than 4.1 µs since a point ② where a mobile terminal actually transmits a call is in the direction in which the search of the base station 8 proceeds from the point ① where the base station 8 is currently performing the search. On the other hand, as shown in FIG. 6(c), when a search and a call are performed in bad timing, the base station 8 takes 4.1 ms at the maximum to find out the mobile terminal since a point ② where a mobile terminal actually transmits a call is distant from the area ① where the base station 8 performs the search.

The following is detail calculation of time required for searching for a calling party in the large area (with radius 100 Km) in FIG. 1(b). When calculating a chip offset in the same manner as the above method, the base station 8 performs the search during the time period from the "base time+0 chip" to the "base time+410 chips", namely, the base station 8 takes 41 ms to perform the path search.

The following is detail calculation of time required for searching for a calling party in the doughnut-shaped area 30 of the present invention shown in FIG. 4. The radius data section 10 in the base station 8 inputs therein the inner radius $R_1$=90 Km and the outer radius $R_2$=100 Km. The chip converting section 11 divides the inner radius and the outer radius by the moving distance Lc per 1 chip, respectively, and then the number of chips "369" corresponding to the inner radius 90 Km and the number of chips "410" corresponding to the outer radius 100 Km are obtained. The number of chips "369" corresponding to the inner radius is used as an offset value, and accordingly, the path search section 12 needs to search only the area corresponding to the 41 chips from the "base time+369 chips" to the "base time+410 chips", thereby realizing the path search in a few milliseconds in the same manner as searching the area with radius 10 Km as described above (FIG. 1(a)).

Figure 7:
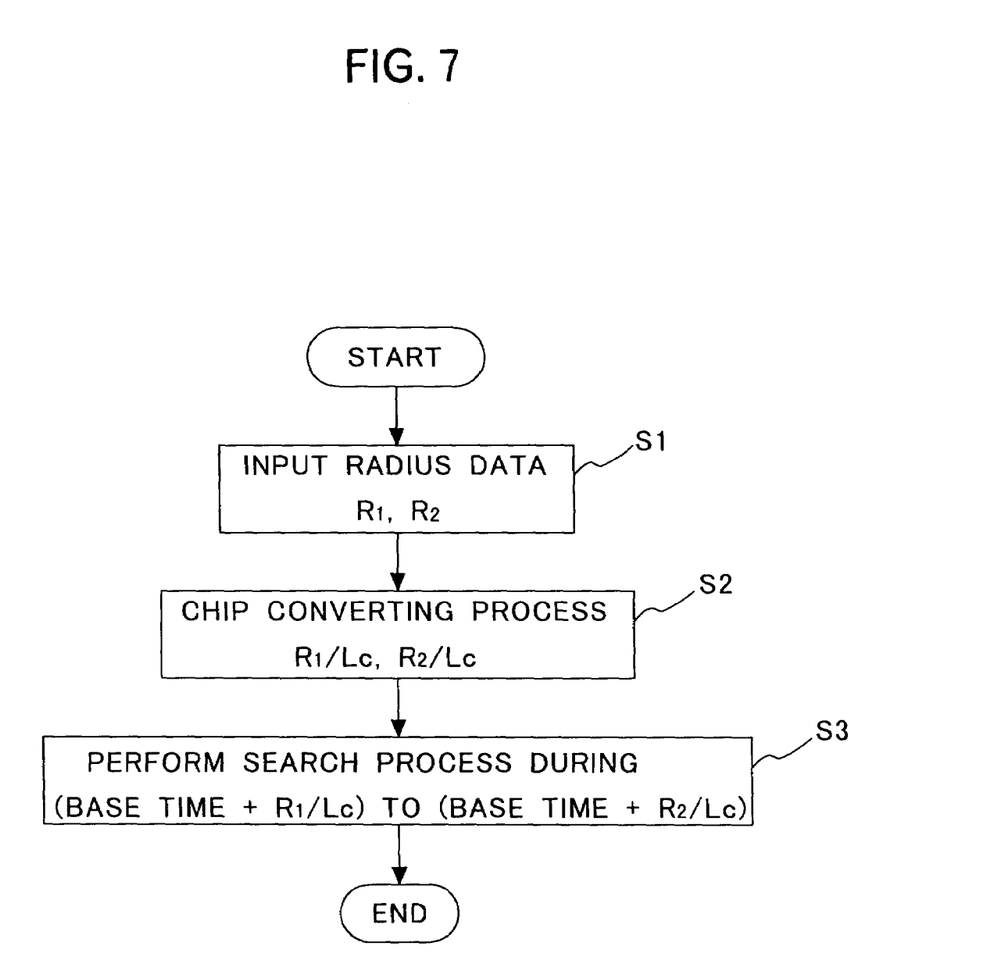
FIG. 7 is a flowchart showing an operation according to the embodiment of the present invention.

FIG. 7 is a flowchart showing an operation according to the above-described embodiment of the present invention. In reference to FIG. 7, first, the radius data section 10 in the base station 8 inputs therein radius data on the inner radius $R_1$ and the outer radius $R_2$ (Step S1). The inner radius $R_1$ serves as an offset value that determines a start timing of a search time, and the outer radius $R_2$ serves as a value that determines a finish time for searching the area. Subsequently, the chip converting section 11 performs calculations as $R_1/Lc$ and $R_2/Lc$ to perform chip conversion (Step S2). Subsequently, the path search section 12 performs path search during the time period as follows (Step S3).

"Base time+$R_1/Lc$"~"Base time+$R_2/Lc$"

The call connection time is actually influenced by a transmission time interval (referred to as ACCESS PROBE SEQUENCE in the case of an IS-95A system) of a call signal from a mobile terminal. For example, when the mobile terminal repeats the sequence of a transmission of a call signal in 20 ms and a pause in 1.6 s, the base station has no chance to receive the next call signal from the mobile terminal until 1.36 s passes unless the base station finishes the search within the transmitting time of the first 20 ms.

This call sequence of the mobile terminal is performed based on directions in a message informed from the base station, the directions being regulated in Chapter 6 of the IS-95A in detail. Namely, in this case, when the speed at which the base station searches the whole area exceeds 20 ms, there is reduced the likelihood that the base station can receive the first call signal, which leads to a longer call connection time. Therefore, according to the present invention, by using a doughnut-shaped service area as a large area (long-distance service area), it becomes possible to restrain the increase of the above-described call connection time.

INDUSTRIAL APPLICABILITY

As described hereinbefore, according to the present invention, an optimum area search method, or a doughnut-shaped service area method is employed in the CDMA system having a large service area not only to reduce the call connection time and to provide improved services for users but also to reduce the generation of call signals, which have to be constantly transmitted until a connection to a network is established, for reducing interference with the other users.

This invention claimed is:

1. A base station for performing a search for a call from a terminal in a service area having a predefined size, said base station comprising:
   a search section, said search section including:
   a data section for inputting first and second distance data of the service area; and
   a path search section for determining a timing of a path search on the basis of a chip offset, said chip offset being a predetermined offset value based on a base time to perform the search in an area less than said service area and between said first and second distances,
   wherein the search section determines a time delayed from the base time by the predetermined offset value as a search start time,
   wherein the search section performs the search during the period from the search start time to a predetermined search finish time, and
   wherein the search section further includes a chip converting section for converting, in response to inputs of parameters that are to serve as the offset value and the search finish time, the parameters into the offset value and the search finish time.

2. A base station as claimed in claim 1, wherein the parameters are used for determining an area of the service area.

3. The base station as claimed in claim 1, wherein the predetermined offset value is used to determine a doughnut shaped service area.

4. A call search method used in a base station for performing a search for a call from a terminal in a service area having a predefined size, said method comprising:
   inputting distance data for identifying the service area into a data section; and
   a search step for setting a predetermined offset value based on a base time to perform the search in an area less than said service area and set by said distance data,
   wherein, in the search step, a time delayed from the base time by the predetermined offset value is determined as a search start time,
   wherein, in the search step, the search is performed during the period from the search start time to a predetermined search finish time, and
   wherein the search step further including a step for converting, in response to inputs of parameters that are to serve as the offset value and the search finish time, the parameters into the offset value and the search finish time.

5. A call search method as claimed in claim 4, wherein the parameters are used for determining an area of the service area.

6. The call search method as claimed in claim 4, wherein the predetermined offset value is used to determine a doughnut shaped service area.

7. A base station for performing a search for a call from a terminal in a service area having a predefined size, said base station comprising:
   a search section, said search section including:
   a data section for inputting first and second distance data of the service area;
   a chip converting section for converting the distance data into chip-unit data; and
   a path search section for determining a timing of path search on the basis of a chip offset, said chip offset being a predetermined offset value for determining a delay of a start time of a path search from a base time that is calculate by the chip converting section to perform the path search.

8. The base station as claimed in claim 7, wherein the distance data is radius data.

9. The base station as claimed in claim 8, wherein the predetermined offset value is used to determine a doughnut shaped service area.

* * * * *